United States Patent
Fuhrmann et al.

(10) Patent No.: US 7,019,832 B2
(45) Date of Patent: Mar. 28, 2006

(54) OPTICAL SPECTROMETER WITH SEVERAL SPECTRAL BANDWIDTHS

(75) Inventors: Thomas Fuhrmann, Eningen (DE); Wolfgang Schmid, Stuttgart (DE); Michael Pahlke, Schorndorf (DE)

(73) Assignee: Acterna Eningen GmbH, Eningen (DE)

( * ) Notice: Subject to any disclaimer, the term of this patent is extended or adjusted under 35 U.S.C. 154(b) by 326 days.

(21) Appl. No.: 10/612,227

(22) Filed: Jul. 2, 2003

(65) Prior Publication Data

US 2004/0070755 A1    Apr. 15, 2004

(30) Foreign Application Priority Data

Jul. 6, 2002    (EP)    .................... 02015135

(51) Int. Cl.
*G01J 3/28*    (2006.01)
(52) U.S. Cl. ................. 356/328; 356/326; 356/334
(58) Field of Classification Search ........ 356/326–328, 356/334; 385/37
See application file for complete search history.

(56) References Cited

U.S. PATENT DOCUMENTS

| | | | |
|---|---|---|---|
| 6,573,990 B1* | 6/2003 | Anderson | ................... 356/328 |
| 6,636,306 B1* | 10/2003 | He et al. | ................... 356/328 |
| 2002/0061160 A1* | 5/2002 | Solgaard et al. | ............ 356/326 |
| 2002/0080353 A1 | 6/2002 | Fuhrmann et al. | |

* cited by examiner

*Primary Examiner*—Gregory J. Toatley, Jr.
*Assistant Examiner*—Kara Geisel
(74) *Attorney, Agent, or Firm*—Reed Smith LLP

(57) ABSTRACT

An optical spectrometer comprises at least two coupling apertures with different mode field diameters, a means for dispersing the light beams exiting each of the coupling apertures along a dispersion axis and at least two decoupling apertures on which the dispersed light beams are imaged and whose mode field diameters each correspond to the mode field diameters of the associated coupling apertures. Due the enlarged mode field diameter, a larger spectral fraction of dispersed light beams, i.e., light of a larger spectral bandwidth, can be coupled into the decoupling aperture than into the decoupling aperture.

19 Claims, 1 Drawing Sheet

OPTICAL SPECTROMETER WITH SEVERAL SPECTRAL BANDWIDTHS

FIELD OF THE INVENTION

The invention relates to an optical spectrometer and, in particular, an optical spectrum analyzer.

BACKGROUND OF THE INVENTION

An optical spectrum analyzer comprising four parallel optical measuring paths is disclosed in EP 1 106 979 A1, incorporated herein by reference. In that EP application, each measuring path comprises a coupling optical fiber with a fiber end which defines the input aperture, a common diffraction grating and a decoupling optical fiber with a fiber end defining the input aperture. SingleMode standard fibers with a core diameter of 9 µm are used as optical fibers for a wavelength region of 1550 nm. The impinging light beams are dispersed by the diffraction grating along a dispersion axis depending on their wavelength such that, depending on the position of rotation of the diffraction grating, different spectral fractions are coupled into the decoupling optical fiber coupled via the decoupling aperture. It is, however, not possible to operate the known optical spectrum analyzer in different measuring modes with different bandwidths at equal wavelengths.

There are known optical spectrum analyzers, e.g., OSA-200 DROP made by Acterna Eningen GmbH which have, in addition to the spectrum analyzing function, the function of a channel filter (i.e., a band pass whose wavelength can be set). For measuring the optical spectrum, a certain optical bandwidth (approximately 70 pm) would be optimum whereas the optimum bandwidth for the function of the channel filter depends on the modulation frequency of the signal to be filtered (e.g., approximately 200 pm for a 10 Gbit/s signal). For this reason, it has not been possible up to now to combine both functions in one device. Therefore, the use of the channel filter was limited, namely to low modulation frequencies, or two separate devices were required which produced additional effort and costs.

In contrast thereto, it is the object of the present invention to provide an optical spectrometer comprising several bandwidths.

SUMMARY OF THE INVENTION

This object is achieved in accordance with the invention by an optical spectrometer, which comprises at least two coupling apertures with different mode field diameters, a means for dispersing the light beams exiting each of the coupling apertures along a dispersion axis, and at least two decoupling apertures onto which each of the dispersed light beams is imaged and whose mode field diameters each correspond to the mode field diameters of the associated coupling apertures.

The increased mode field diameter permits coupling of a larger spectral fraction of dispersed light beams, i.e., a larger spectral bandwidth, into the decoupling aperture. To minimize damping, which occurs during coupling and decoupling of the light beams from or into the coupling and decoupling apertures, the coupling aperture should have the same mode field diameter as the decoupling aperture. The inventive optical spectrometer provides an additional measuring channel (e.g., filter output) with increased bandwidth, i.e. several measuring channels with different bandwidths, and simultaneous operation with several different spectral bandwidths.

In accordance with the invention, one single device combines optimum bandwidth for the optical spectrum analysis and optimum bandwidth for channel filtering of a 10 Gbit/s signal such that an external channel filter can be omitted without any technical disadvantages.

The coupling and/or decoupling apertures are preferably formed by the fiber ends of optical fibers. To produce the larger mode field diameter, the fiber ends may be modified in different ways. For example, the fiber ends may be spherical or aspherical or comprise optical elements having the function of a lens.

In particularly preferred embodiments of the invention, the coupling and/or decoupling apertures with the smaller mode field diameter are formed by the fiber end of SingleMode standard fibers (core diameter 9 µm) and the coupling and/or decoupling apertures with the larger mode field diameter are formed by optical fibers having a fiber end with wider core diameter than the SingleMode standard fibers. Fibers having such a widened core end may be, in particular, so-called TEC (Thermally Expanded Core) fibers having a core diameter which is widened at the fiber end to approximately between 20 µm and approximately 40 µm.

The at least two optical measuring paths of the inventive spectrometer may both have their own optical input or a common optical input which is then connected to each of the measuring paths via an optical switch.

At least the output aperture with the larger mode field diameter is preferably associated with an optical output such that at least the output signal with the larger spectral bandwidth is available for further applications. In contrast thereto, the decoupling aperture with the smaller mode field diameter is preferably associated with a detector for analyzing the spectral fraction coupled into the decoupling aperture with the smaller spectral bandwidth.

Further advantages of the invention can be extracted from the description and the drawing. The features mentioned above and below can be used individually or collectively in arbitrary combination. The embodiments shown and described are not to be understood as exhaustive enumeration but have exemplary character for describing the invention.

DESCRIPTION OF THE PREFERRED EMBODIMENT

Figure 1:
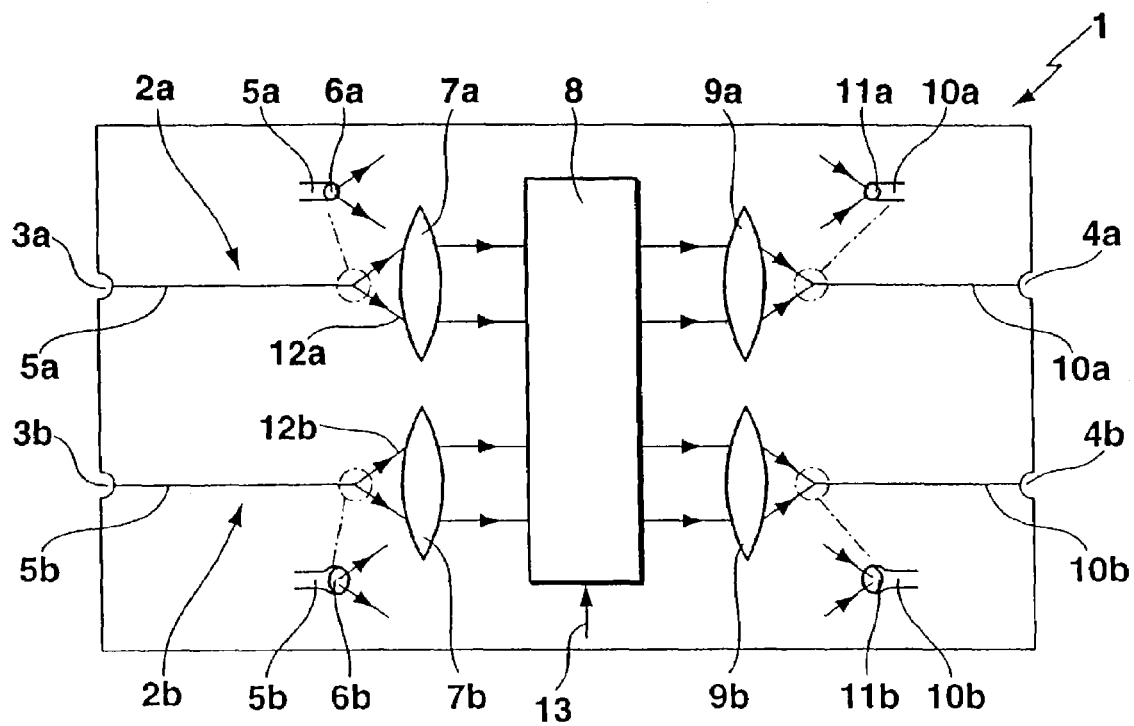
FIG. 1 shows a first embodiment of the inventive optical spectrometer comprising two separate measuring paths.

The optical spectrometer 1 shown in FIG. 1 comprises two parallel optical measuring paths 2a, 2b each comprising one optical input 3a, 3b and one optical output 4a, 4b. The measuring paths 2a, 2b each have a coupling fiber 5a, 5b on their input side, comprising a coupling aperture 6a, 6b, a lens 7a, 7b, a common rotatable dispersion means (e.g. diffraction grating) 8, a lens 9a, 9b and a decoupling fiber 10a, 10b on the output side comprising a decoupling aperture 11a, 11b.

The coupling and decoupling fibers 5a, 10a of the upper optical measuring path 2a in FIG. 1 are SingleMode standard fibers whose fiber ends form the coupling or decoupling apertures 6a, 11a. The coupling or decoupling apertures 6a, 11a are therefore defined by the core or mode field diameter of the SingleMode standard fibers of 9 µm. The coupling and decoupling fibers 5b, 10b of the lower measuring path 2b are SingleMode standard fibers whose fiber ends form the coupling or decoupling apertures 6b, 11b and whose fiber end is widened to a core or mode field diameter of e.g. between approximately 20 and approximately 40 µm compared to SingleMode standard fibers.

The light beams 12a, 12b exiting the coupling apertures 6a, 6b, are each guided as parallel beams to the dispersion means 8 by the lenses 7a, 7b. The light beams impinging on the dispersion means 8 are dispersed along a dispersion axis depending on the wavelength such that, depending on the position of rotation of the dispersion means 8, different spectral fractions are focussed by the lenses 9a, 9b to the respective decoupling aperture 11a, 11b and fed into the decoupling fibers 10a, 10b. Due to the increased mode field diameter, a larger spectral fraction of dispersed light beams, i.e. light having a larger spectral bandwidth, can be coupled into the decoupling aperture 11b than into the decoupling aperture 11a such that the outputs 4a, 4b provide optical output signals with different spectral bandwidths with identical optical input signals. The adjusting mechanism for turning the dispersion means 8 is indicated by arrow 13.

Figure 2:
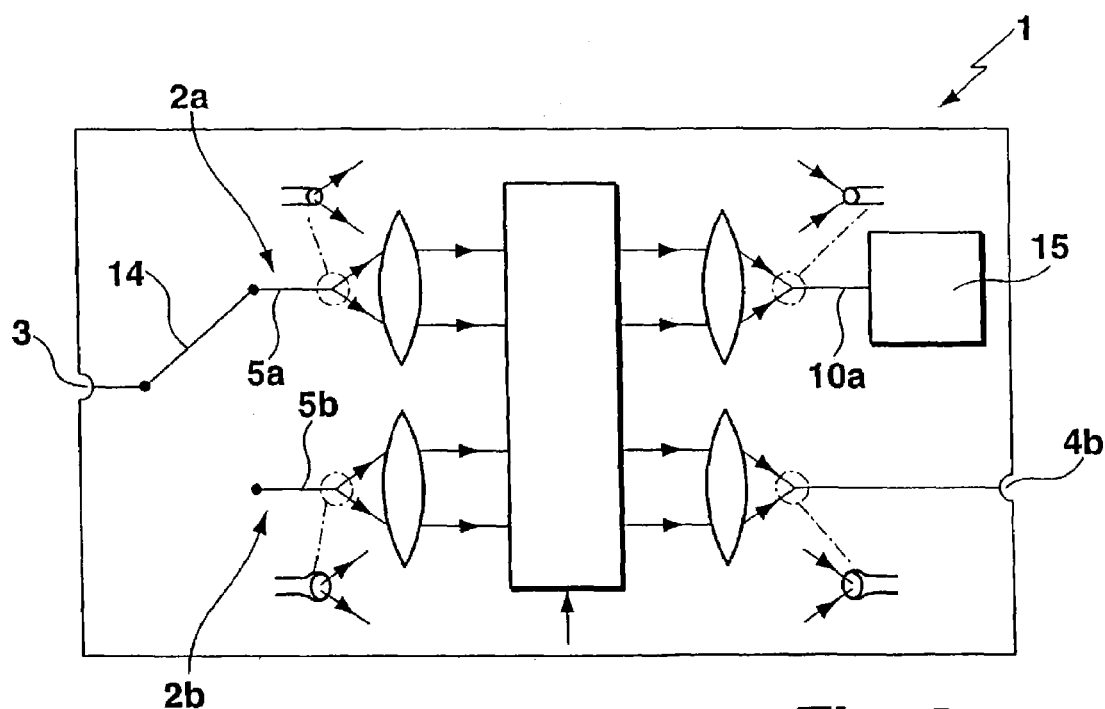
FIG. 2 shows a second embodiment of the inventive optical spectrometer with an optical switch for selecting one of the two optical measuring paths.

The optical spectrometer 1 of FIG. 2 differs from the optical spectrometer of FIG. 1 by a common optical input 3 common to both measuring paths 2a, 2b which is connected by an optical switch 14 to one of the two coupling fibers 5a, 5b and in that the decoupling fiber 10a is connected to a detector (e.g. screen or photo sensor array) 15. This optical spectrometer 1 can alternatively be used to analyze the spectral lines of an optical input spectrum in the detector 15 with high resolution (i.e. with narrow spectral bandwidth) or to decouple a spectral line of the optical input spectrum with wider spectral bandwidth at the output 4b.

The foregoing specific embodiments represent just some of the ways of practicing the present invention. Many other embodiments are possible within the spirit of the invention. Accordingly, the scope of the invention is not limited to the foregoing specification, but instead is given by the appended claims along with their full range of equivalents.

We claim:

1. An optical spectrometer comprising:
    at least two coupling apertures with different mode field diameters,
    means for dispersing the light beams each exiting the coupling apertures along a dispersion axis, and
    at least two decoupling apertures on which the dispersed light beams are each imaged and whose mode field diameters each correspond to the mode field diameters of the associated coupling apertures.

2. The optical spectrometer according to claim 1, wherein the coupling and/or decoupling apertures are formed by the fiber ends of optical fibers.

3. The optical spectrometer according to claim 1, wherein the coupling and decoupling apertures with the smaller mode field diameter are each formed by the fiber end of a SingleMode standard fiber.

4. The optical spectrometer according to claim 1, wherein the coupling and/or decoupling apertures with the larger mode field diameter are formed each by the fiber end of an optical fiber having a widened core diameter at the fiber end compared to a SingleMode standard fiber.

5. The optical spectrometer according to claim 1, wherein the coupling and/or decoupling apertures with the larger mode field diameter are each formed by a spherical or aspherical fiber end of an optical fiber.

6. The optical spectrometer according to claim 1, wherein the coupling and/or decoupling apertures with the larger mode field diameter are each formed by an optical fiber end provided with a lens element.

7. The optical spectrometer according to claim 1, further comprising one single optical input which can be connected to one of the coupling apertures via an optical switch.

8. The optical spectrometer according to claim 1, wherein each coupling aperture is associated with its own optical input.

9. The optical spectrometer according to claim 1, wherein at least the decoupling aperture with the larger mode field diameter is associated with an optical output.

10. The optical spectrometer according to claim 1, wherein the decoupling aperture with the smaller mode field diameter is associated with a detector.

11. The optical spectrometer according to claim 2, wherein:
    the coupling and decoupling apertures with the smaller mode field diameter are each formed by the fiber end of a SingleMode standard fiber,
    and the coupling and/or decoupling apertures with the larger mode field diameter are formed:
    each by the fiber end of an optical fiber having a widened core diameter at the fiber end compared to a SingleMode standard fiber, or
    by a spherical or aspherical fiber end of an optical fiber, or
    by an optical fiber end provided with a lens element,
    wherein the optical spectrometer further comprising one single optical input which can be connected to one of the coupling apertures via an optical switch, wherein at least the decoupling aperture with the larger mode field diameter is associated with an optical output, wherein the decoupling aperture with the smaller mode field diameter is associated with a detector.

12. The optical spectrometer according to claim 2, wherein:
    the coupling and decoupling apertures with the smaller mode field diameter are each formed by the fiber end of a SingleMode standard fiber,
    and the coupling and/or decoupling apertures with the larger mode field diameter are formed:
    each by the fiber end of an optical fiber having a widened core diameter at the fiber end compared to a SingleMode standard fiber, or
    by a spherical or aspherical fiber end of an optical fiber, or
    by an optical fiber end provided with a lens element,
    each coupling aperture is associated with its own optical input,
    at least the decoupling aperture with the larger mode field diameter is associated with an optical output, and
    the decoupling aperture with the smaller mode field diameter is associated with a detector.

13. An optical spectrometer comprising:
    a first coupling aperture having a first core diameter;
    a second coupling aperture having a second core diameter that is larger than the first core diameter;
    a dispersion device arranged to disperse light beams coming from the first and second coupling apertures;
    a first decoupling aperture operable to receive the light beam coming through the dispersion device from the first coupling aperture; and a second decoupling aperture operable to receive the light beam coming through the dispersion device from the second coupling aperture.

14. The optical spectrometer according to claim 13, wherein the core diameters of the first and second decoupling apertures correspond to the core diameters of the respective first and second coupling apertures.

15. The optical spectrometer according to claim 13, further comprising:
  a first optical fiber having the first core diameter, the first coupling aperture being defined by one end of the first optical fiber; and
  a second optical fiber having the second core diameter, the second coupling aperture being defined by one end of the second optical fiber;
  wherein the one end of the second optical fiber has a widened core diameter.

16. The optical spectrometer according to claim 13, wherein the second coupling aperture is defined by a spherical or aspherical end of an optical fiber.

17. The optical spectrometer according to claim 13, further comprising:
  an optical fiber having a first core diameter, wherein the second coupling aperture is defined by one end of the optical fiber and the one end has a widened core diameter which is larger than the first core diameter of the first coupling aperture; and
  a lens element disposed in a light path between the second coupling aperture and the dispersion device.

18. The optical spectrometer according to claim 13, further comprising an optical switch that receives a single light beam and switches the received light beam between the first coupling aperture and the second coupling aperture.

19. The optical spectrometer according to claim 13, wherein both the first and second coupling apertures receive the same single light beam and the dispersion device includes a single diffraction grating that receives the light beams coming from both the first and second coupling apertures.

* * * * *